United States Patent [19]

Foti

[11] 4,049,298
[45] Sept. 20, 1977

[54] COMPRESSION COUPLING

[75] Inventor: Sam J. Foti, Lyndhurst, Ohio

[73] Assignee: The Federal Metal Hose Corporation, Painesville, Ohio

[21] Appl. No.: 623,058

[22] Filed: Oct. 16, 1975

[51] Int. Cl.² .............................................. F16L 25/00
[52] U.S. Cl. .................................... 285/177; 285/373; 285/424
[58] Field of Search ............... 285/373, 419, 364, 365, 285/366, 367, 406, 407, 424, 409, 410, 253, 177

[56] References Cited

U.S. PATENT DOCUMENTS

| | | | |
|---|---|---|---|
| 2,409,576 | 10/1946 | Markey | 285/419 |
| 2,776,153 | 1/1957 | Smith | 285/373 X |
| 3,154,330 | 10/1964 | Clark et al. | 285/419 |
| 3,944,265 | 3/1976 | Hiemstra et al. | 285/373 |

FOREIGN PATENT DOCUMENTS 227,512  4/1960  Australia .............................. 285/373

Primary Examiner—Dave W. Arola

[57] ABSTRACT

A compression coupling for flexible hose, piping or tubing which has an annular sleeve which surrounds the adjacent ends of the tubes or pipes. The sleeve has the form of a circumferentially extensible annular band with an axially extending gap. A jacket member is attached at one end to the sleeve and extends over the gap. An axially extending wrinkle is formed in the jacket member directly over the gap, and a sealant is placed within this wrinkle. Means for clamping the jacket member to the sleeve on the other side of the gap are provided so that as the clamping means is tightened, the sealant is forced into the gap providing a complete circumferential seal. The coupling has an easily-handled unitary construction which uses a minimum of gasket material. It is also light in weight due to the lack of concentric multiple layers.

9 Claims, 7 Drawing Figures

COMPRESSION COUPLING

BACKGROUND OF THE INVENTION

This invention relates to joints or couplings, and particularly to a compression coupling such as used to make connections in a diesel truck exhaust system between the engine exhaust pipe and the flexible metal hose exhaust stack.

In many installations of flexible hose, tubing and piping, it is desirable to install a completely sealed clamp-type coupling to join together the ends of the hose, tube or pipe sections, which may be of the same or different diameters. Often this has to resist heat and/or vibration. Such a coupling should be strong, easily installed, and removable if the design is changed. These couplings usually have an annular sleeve extending circumferentially around the end portions of the tubes or pipes. The sleeve is circumferentially extensible so that the diameter of the sleeve can be increased and the coupling loosened when fitting the coupling around the joint. The coupling also usually has clamping means for tightening and compressing the extensible sleeve around the tube or pipe ends once the coupling is in place. The compressive force holds the clamp in place and keeps the ends of the tube or pipe sections together. To permit it to be extensible, the sleeve has an axially extending gap which widens when the coupling is being installed and narrows when the coupling is clamped in place. Once installed, some form of sealant is necessary over the gap to provide a complete circumferential seal around the ends of the hose, tube or pipe sections.

In the past, in low-heat applications, the necessary circumferential seal has been supplied by providing an annular gasket which fits circumferentailly around the entire sleeve. An outer sleeve was then usually fitted around the gasket, and this outer sleeve was clamped to hold the gasket tightly against the inner sleeve. The resulting product was often a device of three or more layers which was heavy, expensive and difficult to handle. Additionally, the forces on the circumference of the pipes being handled were uneven and caused the pipes to go out-of-round and develop leaks, which add to the air and noise pollution. For high-heat applications, such as truck exhausts, no gasket system has worked due to the high temperatures and the mass of the gasket.

SUMMARY OF THE INVENTION

These problems are overcome by the compression coupling of the present invention.

It is an object of the present invention to provide a compression coupling for thin-walled pipes or tubes of different diameters which applies even forces around the circumference of the pipes or tubes being fitted together.

Another object of the present invention is to provide a coupling having a unitary construction in which all elements of the coupling are attached to each other, making the coupling easier to handle than previous multiple-piece constructions which could come apart prior to and during installation.

Yet another object is to provide a coupling which uses a minimum amount of gasket material, making the coupling less expensive than couplings having a circumferential gasket.

Still another object is to provide a coupling which is lightweight by minimizing the number of layers in the coupling construction.

These and other objects are accomplished by the compression coupling of the present invention in which an annular sleeve is provided which extends circumferentially around the end portions of the pipes or tubes. To permit the sleeve to be circumferentially extensible, it has an axially extending gap. A jacket member is attached to the sleeve on one side of the gap and extends over the gap. The jacket member has an axially extending wrinkle formed directly over the gap which contains a strip of sealant placed over the gap. A clamping means is provided to secure the other end of the jacket member to the sleeve on the other side of the gap. As the clamping means is tightened, the wrinkle on the jacket member becomes taut, and the sealant is pressed down into the gap. The coupling of the present invention has a unitary construction in which a complete circumferential seal is provided by means of the sleeve and the sealant over the gap in the sleeve.

DESCRIPTION OF THE PREFERRED EMBODIMENTS

Figure 1:
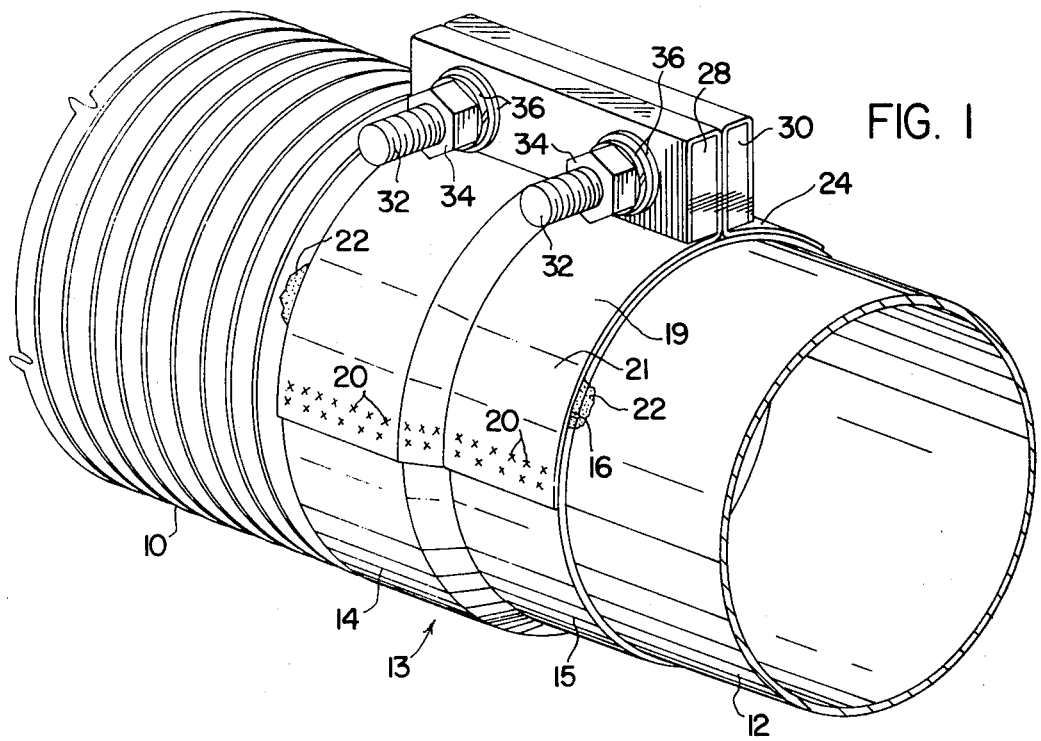
FIG. 1 is a perspective view of the compression coupling of the present invention installed at a pipe or tube fitting and connecting to a flexible metal hose of a larger diameter.
Figure 2:
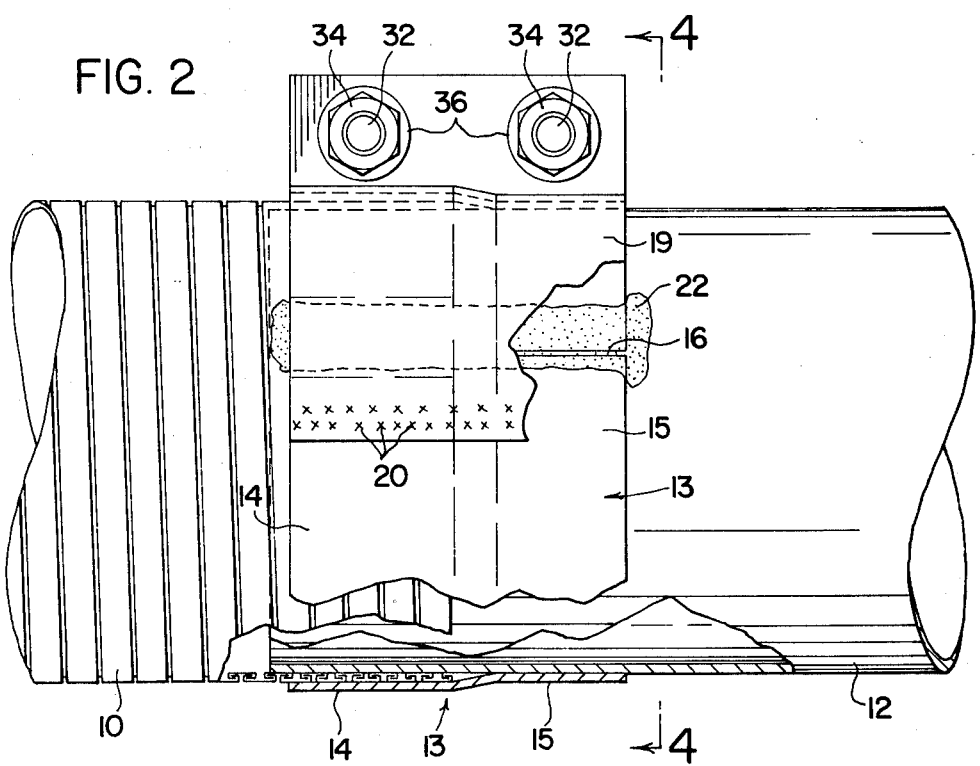
FIG. 2 is a side elevational view of the coupling of FIG. 1.
Figure 3:
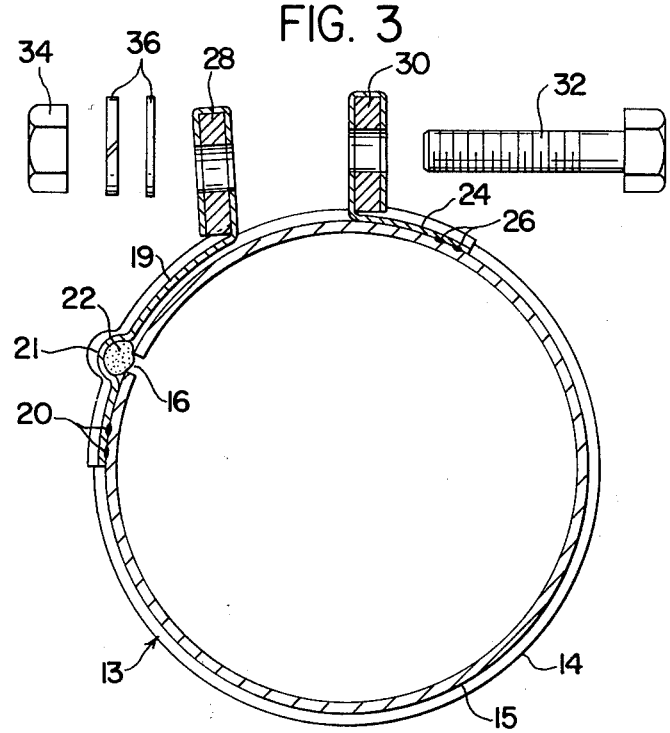
FIG. 3 is an exploded sectional view of the coupling of FIG. 1 prior to installation.
Figure 4:
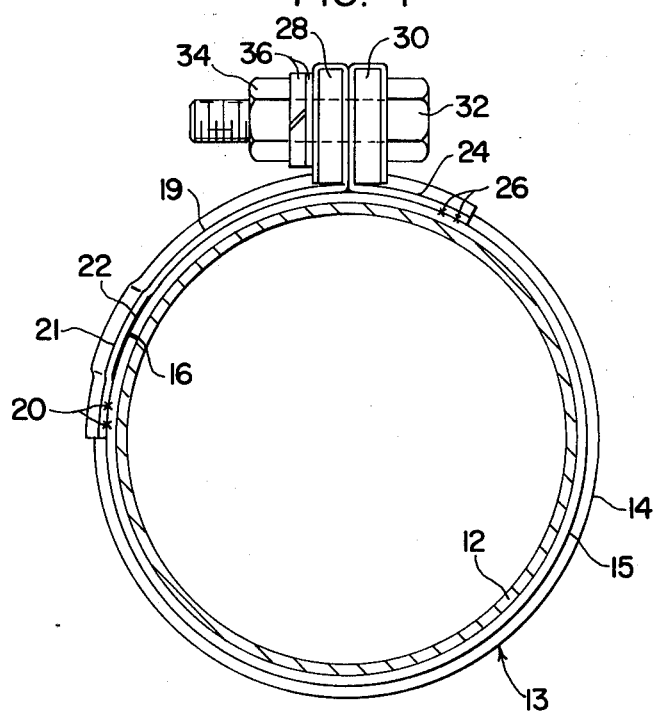
FIG. 4 is a sectional view similar to FIG. 3 showing the coupling after installation, as viewed along the line 4—4 of FIG. 2.

Referring more particularly to the drawings and initially to FIGS. 1-4, there is shown a preferred embodiment of the compression coupling of the present invention. In FIGS. 1, 2 and 4, the coupling is shown installed around the adjacent end portions of a flexible metal hose 10 and a slightly smaller diameter pipe or tube 12. The coupling comprises a sleeve 13 which is formed in an annular band extending circumferentially around the ends of the hose 10 and the tube 12. To accommodate the different outer diameters of the hose 10 and the tube 12, the sleeve 13 has a larger diameter section 14 and a smaller diameter section 15. The sleeve 13 is annularly formed from a flat length of material, and an axially extending gap 16 is formed along the seam where the ends meet. The gap 16 along the sleeve 13 is provided so that the sleeve diameter can be extended when the sleeve is installed over the ends of the hose 10 and tube 12. When the gap 16 is widened, as shown in FIG. 3, the sleeve 13 has a larger diameter, enabling the sleeve to be easily fitted over the ends of the tube and hose. When the coupling is installed and the sleeve compressed, as shown in FIG. 4, the gap 16 is narrowed, and the sleeve 13 forms a seal at the fitting completely around the ends of the tubes except along the gap 16. The tube 12 preferably extends into the hose the full width of the sleeve 13 to reinforce the larger hose against clamping pressures.

To provide a means for sealing the coupling along the gap 16, the coupling has a jacket member 19. As depicted in FIGS. 1–4, the jacket member 19 is attached at one end to the sleeve 13 on the lower side of the gap 16, preferably by welding 20. It is thin and flexible relative to the sleeve 13. The jacket member 19 extends upwardly over the gap 16. Along the line where the jacket member 19 extends over the gap 16, a wrinkle 21 is formed in the jacket member 19 (FIG. 3). The wrinkle 21 resembles an axially extending hump or bulge in the jacket member 19. The wrinkle is preferably approximately 2 to 5 times as wide along the circumference as the gap 16 in the inner section of the sleeve, and as hereinafter explained, is adapted to flatten out when the flanges are clamped together. Beneath the wrinkle 21 a channel is formed, and within this channel there is an axially extending strip of sealant 22 directly over the gap 16. The sealant 22 can be made from any suitable gasket material such as red rubber, black neoprene, white neoprene, muffler sealant, asbestos or the like.

Means are provided for tightly clamping the coupling in a compressive manner around the joint when the coupling is installed, by clamping the loose upper end of the jacket member 19 to the sleeve 13. As shown in FIGS. 3 and 4, the clamping means includes a flange 24 which is attached to the sleeve 13 on the opposite side of the gap 16 from which the jacket member 19 is attached to the sleeve, the attachment preferably being by welding 26. The opposite ends of the jacket member 19 and the flange 24 from those attached to the sleeve 13 are wrapped around the attached-to bars 28 and 30. The bars 28 and 30 are provided with holes through which bolts 32 are inserted. Nuts 34 and washers 36 fit over the bolts 32 to provide a suitable attaching means.

Installation of the coupling of the present invention is quickly and easily accomplished. Before installation, the coupling resembles the depiction of FIG. 3. The wrinkle 21 is fully formed, the gap 16 is relatively wide, and the bar 28 is spaced from the bar 30. The wide opening of the gap 16 gives the sleeve 13 a larger diameter and allows the sleeve to easily fit over the ends of the tubes. After the coupling has been fitted in its desired position, the bolts 32 are inserted through the holes in the bars 28 and 30, and the nuts 34 are threaded onto the bolts 32, clamping the bars 28 and 30 together. As the bars are clamped together, the jacket member 19 becomes taut, and the wrinkle 21 flattens out and conforms to the circumference of the annular sleeve 13, pressing the sealant 22 into the gap 16. When the nut 34 is fully tightened to the bolt 32 and the bars 28 and 30 are tightly together, the coupling resembles that shown in FIGS. 1, 2 and 4. The sleeve 13 fits tightly around the ends of the hose 10 and tube 12 and the sealant 22 is firmly compressed into the gap 16 so that there is a complete circumferential seal around the ends of the tubes.

Figure 5:
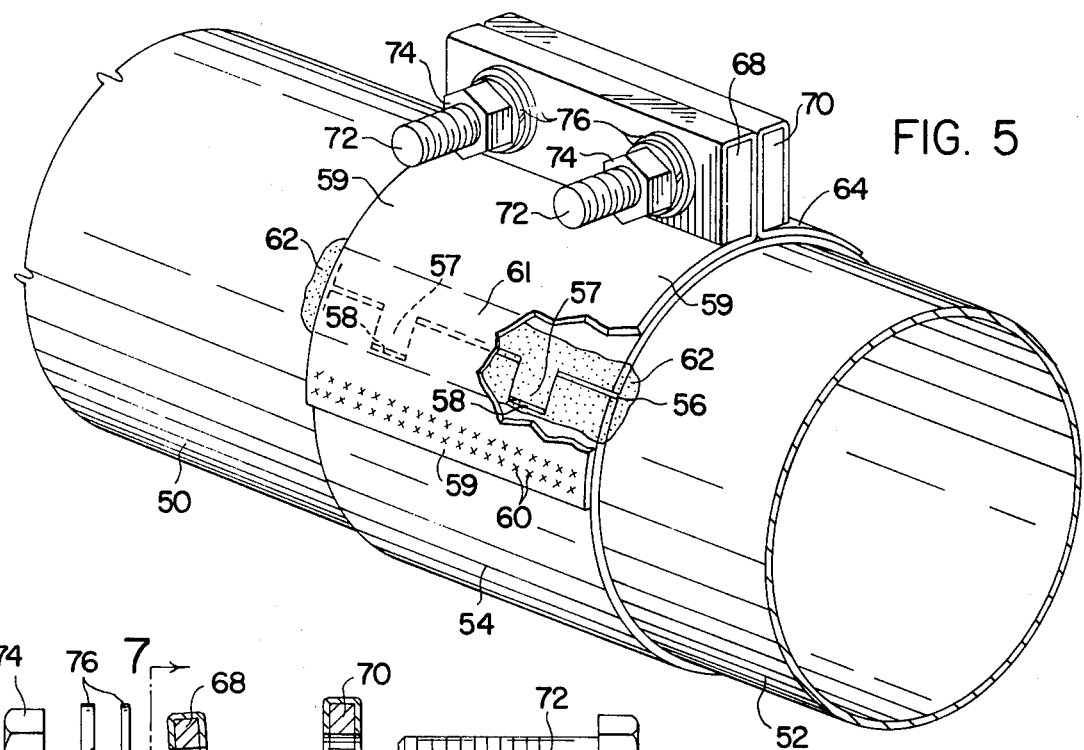
FIG. 5 is a perspective view of another embodiment of the coupling of the present invention connecting pipe or tube fittings of the same diameter.
Figure 6:
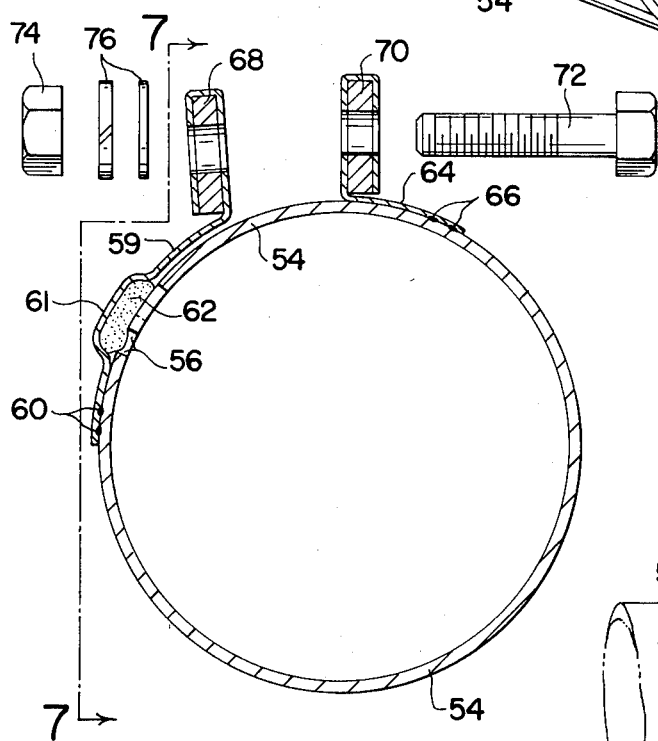
FIG. 6 is an exploded sectional view of the coupling of FIG. 5 prior to installation.
Figure 7:
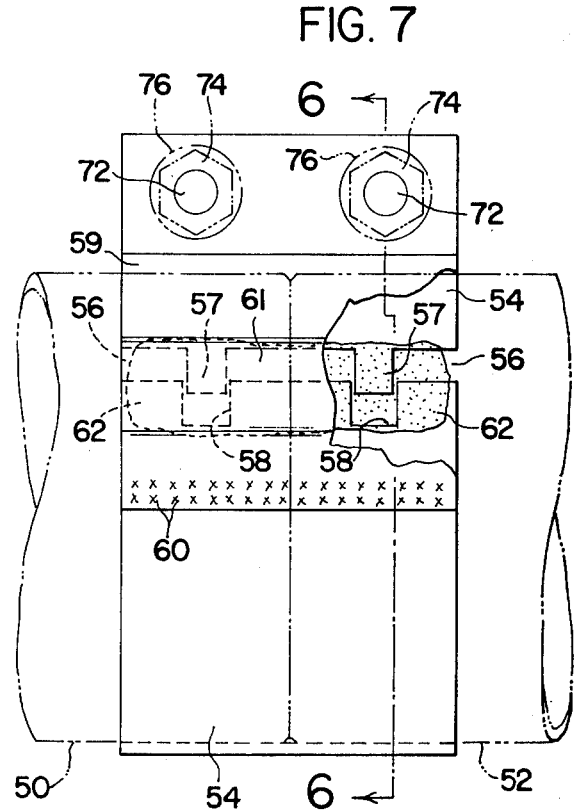
FIG. 7 is a side elevational view of the coupling taken along the line 7—7 of FIG. 6.

An alternative embodiment of the coupling of the present invention is shown in FIGS. 5, 6 and 7. This coupling is particularly suitable for installation around the adjacent ends of two lengths of piping or tubing having approximately the same outer diameter, such as tube 50 and tube 52. This embodiment also has a sleeve 54 which is formed from an annular band extending circumferentially around the ends of the tube 50 and the tube 52. A gap 56 is formed when the ends of the band meet. Instead of a straight gap such as the gap 16, the gap 56 has a zig-zag configuration with the sleeve 54 having a plurality of interlocking tonques 57 and recesses 58. The tonque 57 applies additional compressive force to the ends of the tubes 50 and 52. This additional compressive force aids in keeping the lengths of tubes 50 and 52 firmly together.

A jacket member 59 is attached to the sleeve 54 on the lower side of the gap 56 such as by welding 60 and extends up and over the gap. The jacket member 59 has a wrinkle 61 directly over the axially extending gap 56. Beneath the wrinkle 61, in the channel formed thereby, is a strip of sealant 62 made from a suitable gasket material. The width of the strip of sealant 62 is wider than the strip of sealant 22 in the previous embodiment because the area to be sealed is wider due to the configuration of the tonques 57 and recesses 58.

Clamping means include a flange 64 attached to the sleeve 54 on the side of the gap 56 opposite that to which the jacket member 59 is attached. The flange 64 is preferably attached to the sleeve 54 by welding 66. The ends of the jacket member 59 and flange 64 opposite those attached to the sleeve 54 are wrapped around bars 68 and 70. The bars 68 and 70 have holes through which bolts 72 are inserted. Nuts 74 and washers 76 fit over the bolts 72 to provide a means by which the jacket member 59 and the flange 64 are attached after installation of the coupling.

As can be seen, the embodiment of the coupling of the present invention shown in FIGS. 5–7 is very similar to that shown in FIGS. 1–4 except for the tonques 57 and recesses 58 along the gap 56 and the requisite broader wrinkle 61 and sealant strip 62 necessary to seal the gap 56.

The sleeves 13 or 54 can be made from any conventional steel, plated or unplated. The jacket members 19 or 59 are preferably made of stainless steel because it retains its resiliency and memory under load and heat conditions. Materials which have similar behavior under load may also be used. The flanges 24 and 64 are likewise preferably made of stainless steel.

The coupling of the present invention has a unitary construction with a single-layered sleeve which allows the coupling to be easily fitted, and lightweight. In addition, only a thin strip of sealant 22 or 62 is needed as contrasted with the circumferential gasket of the prior art.

While the invention has been shown and described with respect to specific embodiments thereof, these are intended for the purpose of illustration rather than limitation. Other modifications and variations in the specific article herein shown and described will be apparent to those skilled in the art, all within the intended scope and spirit of the invention. Accordingly, the invention is not to be limited to the specific embodiment herein shown and described nor in any other way that is inconsistent with the extent to which the progress in the art has been advanced by the invention.

I claim:

1. A compression coupling for fitting around cylindrical objects, which comprises:
    a circumferentially extensible, annular sleeve for extending around the cylindrical objects and having a gap therein extending parallel to the longitudinal axis;
    a relatively thin jacket member attached at one end to the sleeve, the jacket member extending over the gap and having an axially extending conformable wrinkle formed therein over the gap, said wrinkle being adapted to receive a sealant radially outside the sleeve; and means for clamping the other end of the jacket member to the sleeve on the opposite side of the gap from which the jacket member is attached to the sleeve, whereby when clamped the wrinkle is substantially conformed to the circumference of the annular sleeve and the sealant is forced radially inwardly and pressed into the gap.

2. A compression coupling according to claim 1 wherein the clamping means comprises:

a flange attached at one end to the sleeve on the opposite side of the gap from which the jacket member is attached to the sleeve; and means for securely attaching the other end of the flange to the other end of the jacket member.

3. A compression coupling according to claim 1 in which the sleeve has a plurality of tonques and recesses formed therein along the edge of the gap.

4. A compression coupling according to claim 1 in which the sleeve has a larger diameter portion and a smaller diameter portion for fitting around cylindrical objects of different diameters, and in which the gap extends in a substantially straight line.

5. A compression coupling for joining together and sealing the adjacent ends of hollow cylindrical objects, which comprises:

a circumferentially extensible, annular steel sleeve extending circumferentially around the adjacent ends of the hollow cylindrical objects and having an axially extending gap therein;

a stainless steel jacket member attached at one end to the sleeve, the jacket member extending over the gap and having an axially extending conformable wrinkle formed therein over the gap, a channel being formed over the gap beneath the wrinkle thereby and being adapted to receive a strip of sealant disposed radially outside the sleeve and extending axially within said channel;

a flange attached at one end to the sleeve on the opposite side of the gap from which the jacket member is attached to the sleeve; and means for securely attaching the other end of the flange to the other end of the jacket member.

6. The combination of a tube and a flexible metal hose of larger diameter joined together by a compression coupling which comprises an annular sleeve with an axial gap, said annular sleeve being disposed around the tube and hose with the sleeve diameter being slightly larger than and capable of corresponding to the respective hose and sleeve diameters, a jacket member attached at one end to the sleeve and extending over the gap in the sleeve, a flange attached on the sleeve on the side of the gap opposite to the jacket member, sealant disposed radially outside the sleeve between the gap and jacket member, and means for drawing said jacket and flange toward each other thereby deforming said sleeve into engagment with said tube and hose, said jacket having a conformable wrinkle over said gap and sealant, the tube being inserted into said hose at least the width of the sleeve.

7. A compression coupling according to claim 1 comprising in addition:

a sealant disposed radially outside the sleeve, the sealant extending axially beneath the wrinkle over the gap.

8. A compression coupling according to claim 2 wherein the attaching means comprises:

a first bar means fixed to said other end of the jacket member adjacent the sleeve;

a second bar means fixed to said other end of said flange adjacent the sleeve; and means for fastening the first bar means adjacent the second bar means.

9. A compression coupling according to claim 8 wherein the fastening means comprises dual independent fasteners.

* * * * *